US012464132B2

United States Patent
Kahu et al.

(10) Patent No.: US 12,464,132 B2
(45) Date of Patent: Nov. 4, 2025

(54) COEFFICIENT SIGN PREDICTION FOR TRANSFORM SKIP

(71) Applicant: Tencent America LLC, Palo Alto, CA (US)

(72) Inventors: Samruddhi Yashwant Kahu, Laguna Hills, CA (US); Xin Zhao, San Jose, CA (US); Madhu Peringassery Krishnan, Mountain View, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 189 days.

(21) Appl. No.: 17/984,229

(22) Filed: Nov. 9, 2022

(65) Prior Publication Data

US 2023/0283779 A1    Sep. 7, 2023

Related U.S. Application Data

(60) Provisional application No. 63/315,348, filed on Mar. 1, 2022.

(51) Int. Cl.
*H04N 19/00* (2014.01)
*H04N 19/105* (2014.01)
(Continued)

(52) U.S. Cl.
CPC ......... *H04N 19/136* (2014.11); *H04N 19/105* (2014.11); *H04N 19/132* (2014.11); *H04N 19/176* (2014.11)

(58) Field of Classification Search
CPC .. H04N 19/136; H04N 19/105; H04N 19/132; H04N 19/176
See application file for complete search history.

(56) References Cited

U.S. PATENT DOCUMENTS

2015/0103918 A1\* 4/2015 Wang .................. H04N 19/625
                                                            375/240.24
2017/0310980 A1\* 10/2017 Minoo .................... H04N 19/82
(Continued)

OTHER PUBLICATIONS

Bross et al., Versatile Video Coding (Draft 2), Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-v6, pp. 1-139.

(Continued)

*Primary Examiner* — Zhihan Zhou
(74) *Attorney, Agent, or Firm* — Morgan, Lewis & Bockius LLP

(57) ABSTRACT

Aspects of the present disclosure provide methods and apparatuses for video encoding/decoding. In some examples, an apparatus includes processing circuitry that is configured to receive a coded video stream including a current block that is associated with a transform block, and determine whether a transform skip is used in the transform block. In response to a determination that the transform skip is not used in the transform block, the processing circuitry is configured to perform a first transform coefficient sign prediction in which (i) first signs of a first plurality of transform coefficients are predicted based on a first plurality of neighboring samples, and (ii) second signs of a second plurality of transform coefficients are predicted based on a second plurality of neighboring samples. The processing circuitry is further configured to reconstruct the current block based on the first plurality of transform coefficients and the second plurality of transform coefficients.

20 Claims, 12 Drawing Sheets

(51) Int. Cl.
*H04N 19/132* (2014.01)
*H04N 19/136* (2014.01)
*H04N 19/176* (2014.01)

(56) References Cited

U.S. PATENT DOCUMENTS

| | | | |
|---|---|---|---|
| 2018/0007360 A1* | 1/2018 | Ventelae, Ventelae | ............... H04N 19/134 |
| 2018/0176556 A1* | 6/2018 | Zhao | H04N 19/176 |
| 2018/0205947 A1* | 7/2018 | Xu | H04N 19/91 |
| 2019/0313113 A1* | 10/2019 | Lee | H04N 19/46 |
| 2020/0260070 A1* | 8/2020 | Yoo | H04N 19/103 |
| 2020/0296420 A1* | 9/2020 | Karczewicz | H04N 19/70 |
| 2021/0067807 A1* | 3/2021 | Lainema | H04N 19/184 |
| 2021/0211672 A1* | 7/2021 | Rusanovskyy | H04N 19/13 |
| 2021/0368176 A1* | 11/2021 | Bross | H04N 19/102 |

OTHER PUBLICATIONS

Rivaz et al., AV1 Bitstream & Decoding Process Specification The Alliance for Open Media 681, Jan. 8, 2019, pp. 1-681.
Chen et al., An Overview of Core Coding Tools in the AV1 Video Codec, 2018 Picture Coding Symposium (PCS), San Francisco, CA, USA, 2018, pp. 41-45.

\* cited by examiner

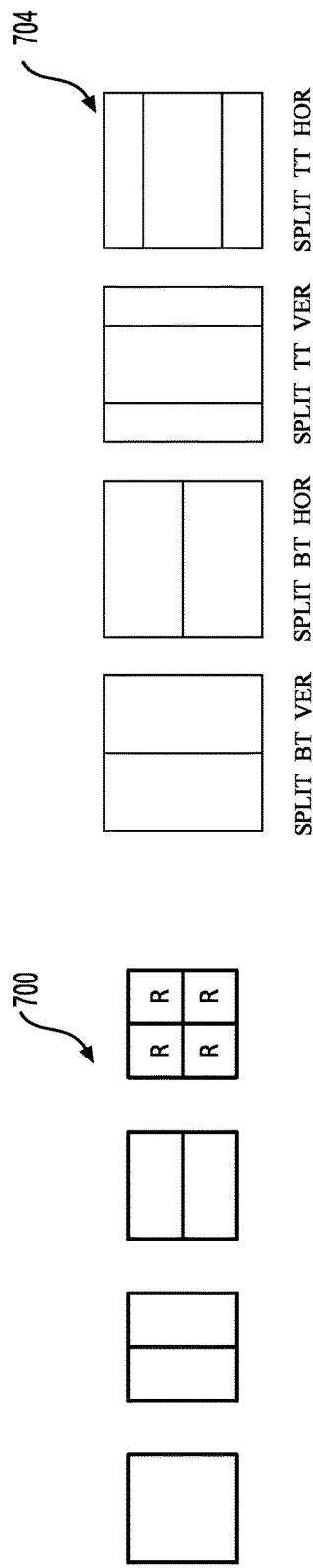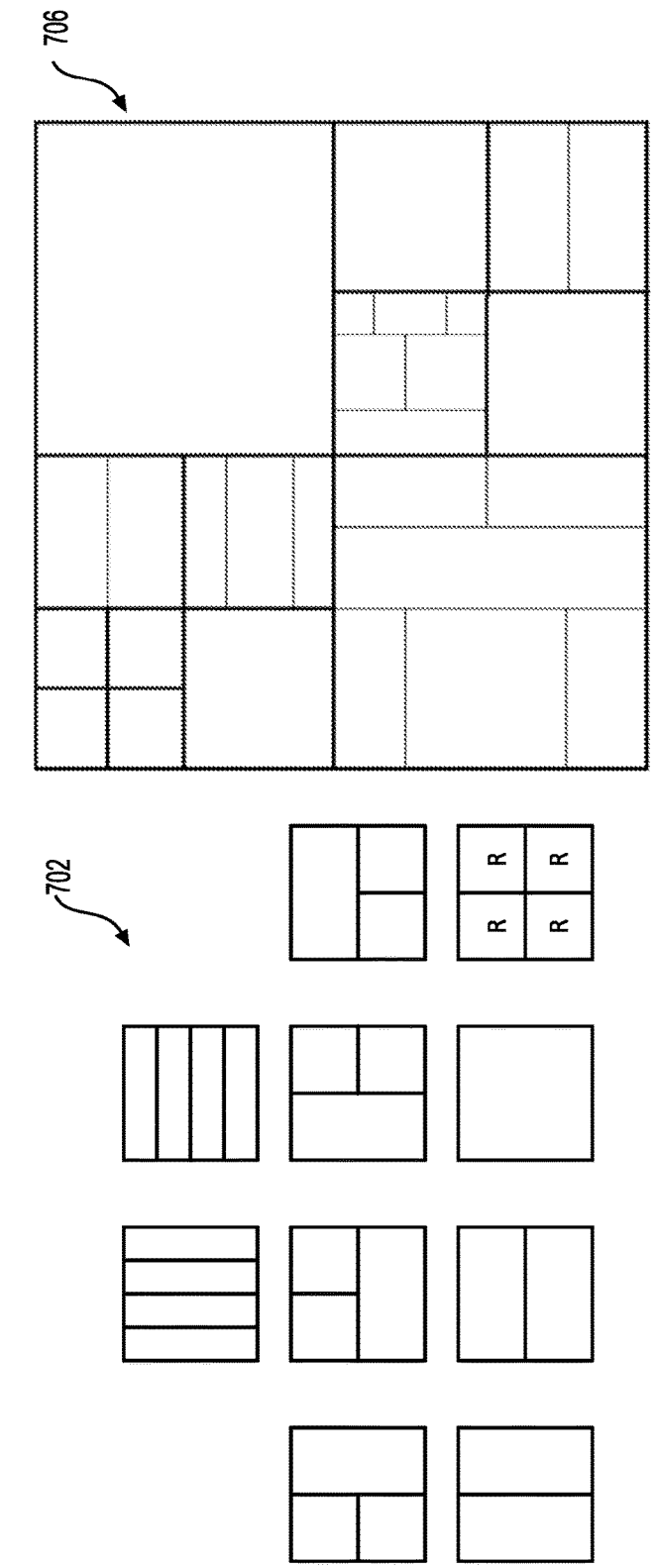
FIG. 7A  FIG. 7B  FIG. 7C  FIG. 7D

COEFFICIENT SIGN PREDICTION FOR TRANSFORM SKIP

CROSS-REFERENCE TO RELATED APPLICATION

The present application claims the benefit of priority to U.S. Provisional Application No. 63/315,348, entitled "COEFFICIENT SIGN PREDICTION FOR TRANSFORM SKIP" and filed on Mar. 1, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. MPEG stands for Moving Picture Experts Group. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the present disclosure provide methods and apparatuses for video encoding/decoding.

Some exemplary aspects provide transform coefficient sign prediction when transform skip is applied in one or both dimensions.

In some example, an apparatus for video encoding/decoding includes processing circuitry. The processing circuitry is configured to receive a coded video stream including a current block that is associated with a transform block, and determine whether a transform skip is used in the transform block. In response to a determination that the transform skip is not used in the transform block, the processing circuitry is configured to perform a first transform coefficient sign prediction in which (i) first signs of a first plurality of transform coefficients are predicted based on a first plurality of neighboring samples, and (ii) second signs of a second plurality of transform coefficients are predicted based on a second plurality of neighboring samples. The processing circuitry is further configured to reconstruct the current block based on the first plurality of transform coefficients and the second plurality of transform coefficients.

In some aspects, the processing circuitry is configured to perform a second transform coefficient sign prediction for the transform block in response to determining that the transform skip is used in the transform block, the second transform coefficient sign prediction being different from the first transform coefficient sign prediction.

In some aspects, the first transform coefficient sign prediction is disabled responsive to the transform skip being used in the transform block.

In some aspects, the processing circuitry is configured to determine whether one of a one-dimensional horizontal transform skip and a one-dimensional vertical transform skip is used. Responsive to the one-dimensional horizontal transform skip being used in the transform block, signs of coefficients in different columns of the transform block are predicted by the second transform coefficient sign prediction independently. The processing circuitry is configured to predicts a coefficient sign of a column using only reconstructed samples neighboring the column.

In some aspects, the processing circuitry is configured to determine whether one of a one-dimensional horizontal transform skip and a one-dimensional vertical transform skip is used. Responsive to the one-dimensional horizontal transform skip being used in the transform block, signs of coefficients in a first column of the transform block are predicted by the second transform coefficient sign prediction based on: one or more reconstructed columns to the left of the transform block; and one or more reconstructed pixels above the first column of the transform block.

In some aspects, the processing circuitry is configured to determine whether one of a one-dimensional horizontal transform skip and a one-dimensional vertical transform skip is used. Responsive to the one-dimensional horizontal transform skip being used in the transform block, signs of coefficients in a column of the transform block other than a first column are predicted by the second transform coefficient sign prediction using one or more reconstructed pixels in one or more rows above the transform block.

In some aspects, the processing circuitry is configured to determine whether one of a one-dimensional horizontal transform skip and a one-dimensional vertical transform skip is used. Responsive to the one-dimensional vertical transform skip being used in the transform block, signs of coefficients in different rows of the transform block are predicted by the second transform coefficient sign prediction independently. The processing circuitry is configured to predict a coefficient sign of a row using only reconstructed samples neighboring the row.

In some aspects, the processing circuitry is configured to determine whether one of a one-dimensional horizontal transform skip and a one-dimensional vertical transform skip is used. Responsive to the one-dimensional vertical transform skip being used in the transform block, signs of coefficients in a first row of the transform block are predicted by the second transform coefficient sign prediction based on: one or more reconstructed rows above the transform block; and one or more reconstructed pixels to the left of the transform block.

In some aspects, the processing circuitry is configured to determine whether one of a one-dimensional horizontal transform skip and a one-dimensional vertical transform skip is used. Responsive to the one-dimensional vertical transform skip being used in the transform block, signs of coefficients in a row of the transform block other than a first row are predicted by the second transform coefficient sign prediction using one or more reconstructed pixels in one or more columns to the left of the transform block.

In some aspects, the first transform coefficient sign prediction is disabled responsive to a one-dimensional transform skip being used in the transform block.

In some aspects, a first total number of signs predicted by the second transform coefficient sign prediction when one-dimensional transform skip is applied in the transform block is different than a second total number of signs predicted by the first transform coefficient sign prediction when the transform skip is not applied in any direction in the transform block.

In some aspects, the processing circuitry is configured to determine whether a two-dimensional transform skip is used. Responsive to the two-dimensional transform skip being used in the transform block, the processing circuitry is configured to predict a coefficient sign only for pixels in a first row or a first column of the transform block using one or more reconstructed pixels in one or more rows or columns adjacent to the transform block.

In some aspects, the processing circuitry is configured to determine whether a forward skip coding (FSC) is used. Responsive to the FSC being used in the transform block, the processing circuitry is configured to predict a coefficient sign only for pixels in a first row or a first column of the transform block using one or more reconstructed pixels in one or more rows or columns adjacent to the transform block.

In some aspects, the processing circuitry is configured to determine whether a two-dimensional transform skip is used. Responsive to the two-dimensional transform skip being used in the transform block, a sign of a coefficient in a top left pixel of the transform block is predicted by the second transform coefficient sign prediction based on: one or more reconstructed pixels above the top left pixel in one or more rows above the transform block; and one or more reconstructed pixels to the left of the top left pixel in one or more columns to the left of the transform block.

In some aspects, the processing circuitry is configured to determine whether a two-dimensional transform skip is used. Responsive to the two-dimensional transform skip being used in the transform block, a sign of a coefficient in a pixel in a first row of the transform block is predicted by the second transform coefficient sign prediction based on: one or more first reconstructed pixels in one or more rows above the transform block and the pixel; and one or more second reconstructed pixels to the left or right of the one or more first reconstructed pixels in the one or more rows.

In some aspects, the processing circuitry is configured to determine whether a two-dimensional transform skip is used. Responsive to the two-dimensional transform skip being used in the transform block, a sign of a coefficient in a pixel in a first column of the transform block is predicted by the second transform coefficient sign prediction based on: one or more first reconstructed pixels in one or more columns to the left of the transform block and the pixel; and one or more second reconstructed pixels above or below the one or more first reconstructed pixels in the one or more columns.

In some aspects, the first transform coefficient sign prediction is not enabled responsive to a two-dimensional transform skip being used in the transform block.

In some aspects, the first transform coefficient sign prediction is not enabled for intra coded blocks using a forward skip coding (FSC) mode.

In some aspects, the first transform coefficient sign prediction is enabled for inter coded blocks based on whether a forward skip coding (FSC) mode is used for the inter coded blocks.

In some examples, an apparatus for video encoding/decoding includes processing circuitry. The processing circuitry is configured to determine whether a transform skip is used in a transform block. The processing circuitry is further configured to perform a transform coefficient sign prediction based on whether the transform skip is determined to be used in the transform block. The processing circuitry is further configured to determine transform coefficients based on whether the transform skip is determined to be used in the transform block. The processing circuitry is further configured to reconstruct a current block based on the determined transform coefficients. The transform coefficient sign prediction is a first transform coefficient sign prediction that is performed for the transform block responsive to the transform skip being determined as not used in the transform block.

In some aspects, the transform coefficient sign prediction is a second transform coefficient sign prediction that is performed for the transform block responsive to the transform skip being determined as used in the transform block, the second transform coefficient sign prediction being different from the first transform coefficient sign prediction.

In some aspects, the first transform coefficient sign prediction is disabled responsive to the transform skip being used in the transform block.

In some aspects, responsive to a one-dimensional horizontal transform skip being used in the transform block, signs of coefficients in different columns of the transform block are predicted by the second transform coefficient sign prediction independently, and the performing the second transform coefficient sign prediction includes predicting a coefficient sign of a column using only reconstructed samples neighboring the column.

In some aspects, responsive to a one-dimensional horizontal transform skip being used in the transform block, signs of coefficients in a first column of the transform block are predicted by the second transform coefficient sign prediction based on one or more reconstructed columns to the left of the transform block, and one or more reconstructed pixels above the first column of the transform block.

In some aspects, responsive to a one-dimensional horizontal transform skip being used in the transform block, signs of coefficients in a column of the transform block other than a first column are predicted by the second transform coefficient sign prediction using one or more reconstructed pixels in one or more rows above the transform block.

In some aspects, responsive to a one-dimensional vertical transform skip being used in the transform block, signs of coefficients in different rows of the transform block are predicted by the second transform coefficient sign prediction independently, and the performing the second transform coefficient sign prediction includes predicting a coefficient sign of a row using only reconstructed samples neighboring the row.

In some aspects, responsive to a one-dimensional vertical transform skip being used in the transform block, signs of coefficients in a first row of the transform block are predicted by the second transform coefficient sign prediction based on one or more reconstructed rows above the transform block, and one or more reconstructed pixels to the left of the transform block.

In some aspects, responsive to a one-dimensional vertical transform skip being used in the transform block, signs of coefficients in a row of the transform block other than a first row are predicted by the second transform coefficient sign prediction using one or more reconstructed pixels in one or more columns to the left of the transform block.

In some aspects, the transform coefficient sign prediction is disabled responsive to a one-dimensional transform skip being used in the transform block.

In some aspects, a first total number of signs predicted by the second transform coefficient sign prediction when one-dimensional transform skip is applied in the transform block is different than a second total number of signs predicted by the first transform coefficient sign prediction when the transform skip is not applied in any direction in the transform block.

In some aspects, responsive to a two-dimensional transform skip or a forward skip coding (FSC) being used in the transform block, the performing the second transform coefficient sign prediction includes predicting a coefficient sign only for pixels in a first row or a first column of the transform block using one or more reconstructed pixels in one or more rows or columns adjacent to the transform block.

In some aspects, responsive to a two-dimensional transform skip being used in the transform block, a sign of a coefficient in a top left pixel of the transform block is predicted by the second transform coefficient sign prediction based on one or more reconstructed pixels above the top left pixel in one or more rows above the transform block, and one or more reconstructed pixels to the left of the top left pixel in one or more columns to the left of the transform block.

In some aspects, responsive to a two-dimensional transform skip being used in the transform block, a sign of a coefficient in a pixel in a first row of the transform block is predicted by the second transform coefficient sign prediction based on one or more first reconstructed pixels in one or more rows above the transform block and the pixel, and one or more second reconstructed pixels to the left or right of the one or more first reconstructed pixels in the one or more rows.

In some aspects, responsive to a two-dimensional transform skip being used in the transform block, a sign of a coefficient in a pixel in a first column of the transform block is predicted by the second transform coefficient sign prediction based on one or more first reconstructed pixels in one or more columns to the left of the transform block and the pixel, and one or more second reconstructed pixels above or below the one or more first reconstructed pixels in the one or more columns.

In some aspects, the transform coefficient sign prediction is not enabled responsive to a two-dimensional transform skip being used in the transform block.

In some aspects, the transform coefficient sign prediction is not enabled for intra coded blocks using a forward skip coding (FSC) mode.

In some aspects, the transform coefficient sign prediction is not enabled for inter coded blocks using a forward skip coding (FSC) mode.

In some aspects, the transform coefficient sign prediction is enabled for inter coded blocks not using a forward skip coding (FSC) mode.

Aspects of the disclosure also provide a non-transitory computer-readable medium storing instructions which when executed by a computer for video encoding/decoding cause the computer to perform the any of the methods for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 7A shows an exemplary coding tree structure, in accordance with an embodiment of the present disclosure.

FIG. 7B shows an exemplary coding tree structures, in accordance with an embodiment of the present disclosure.

FIG. 7C shows exemplary multi-type tree splitting modes, in accordance with an embodiment of the present disclosure.

FIG. 7D shows an exemplary quad-tree with nested multi-type tree coding block structure, in accordance with an embodiment of the present disclosure.

DETAILED DESCRIPTION OF EMBODIMENTS

Figure 1:
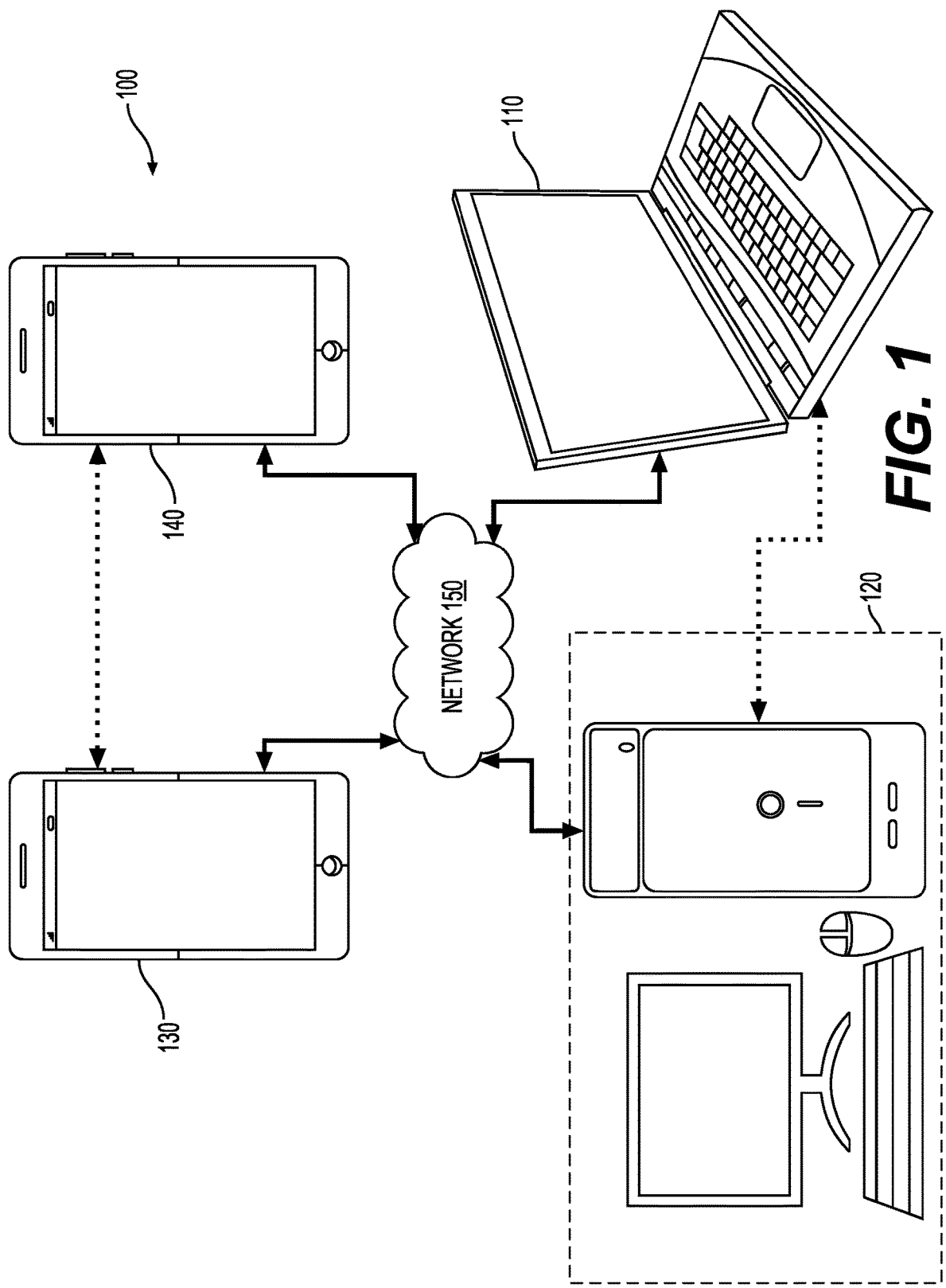
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
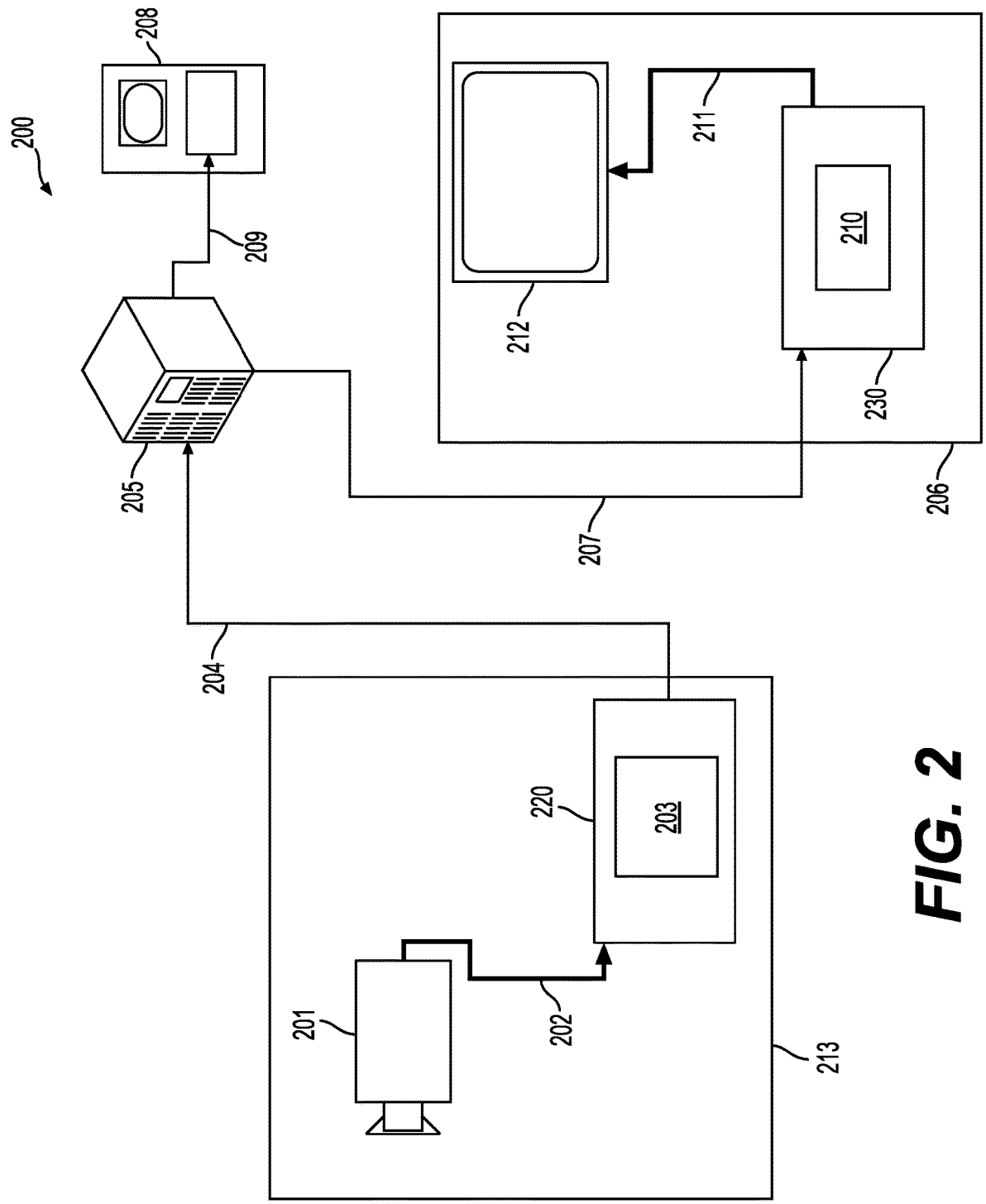
FIG. 2 is a schematic illustration of a simplified block diagram of a communication system in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including Compact Disk (CD), Digital Video Disc (DVD), memory stick, and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
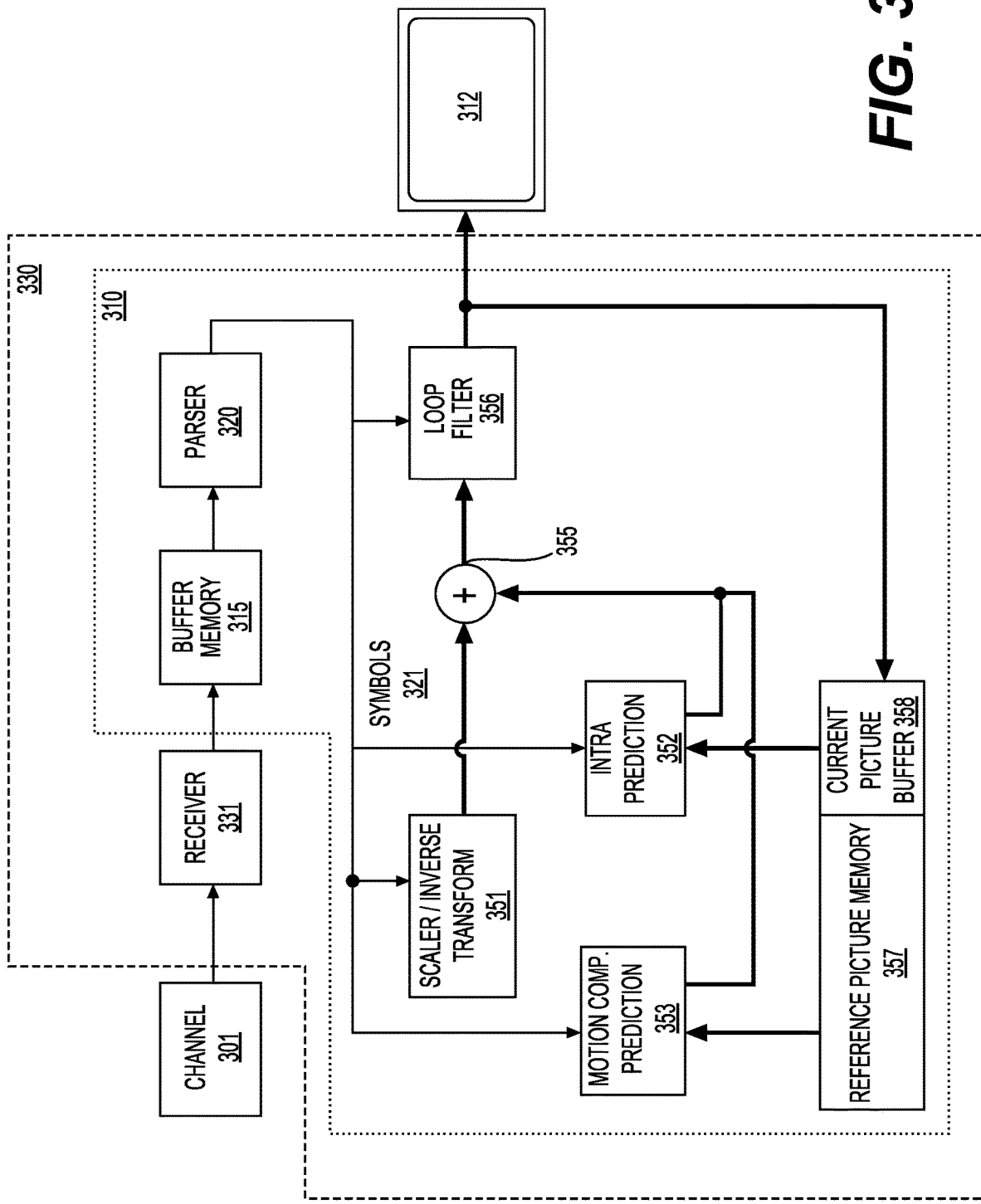
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
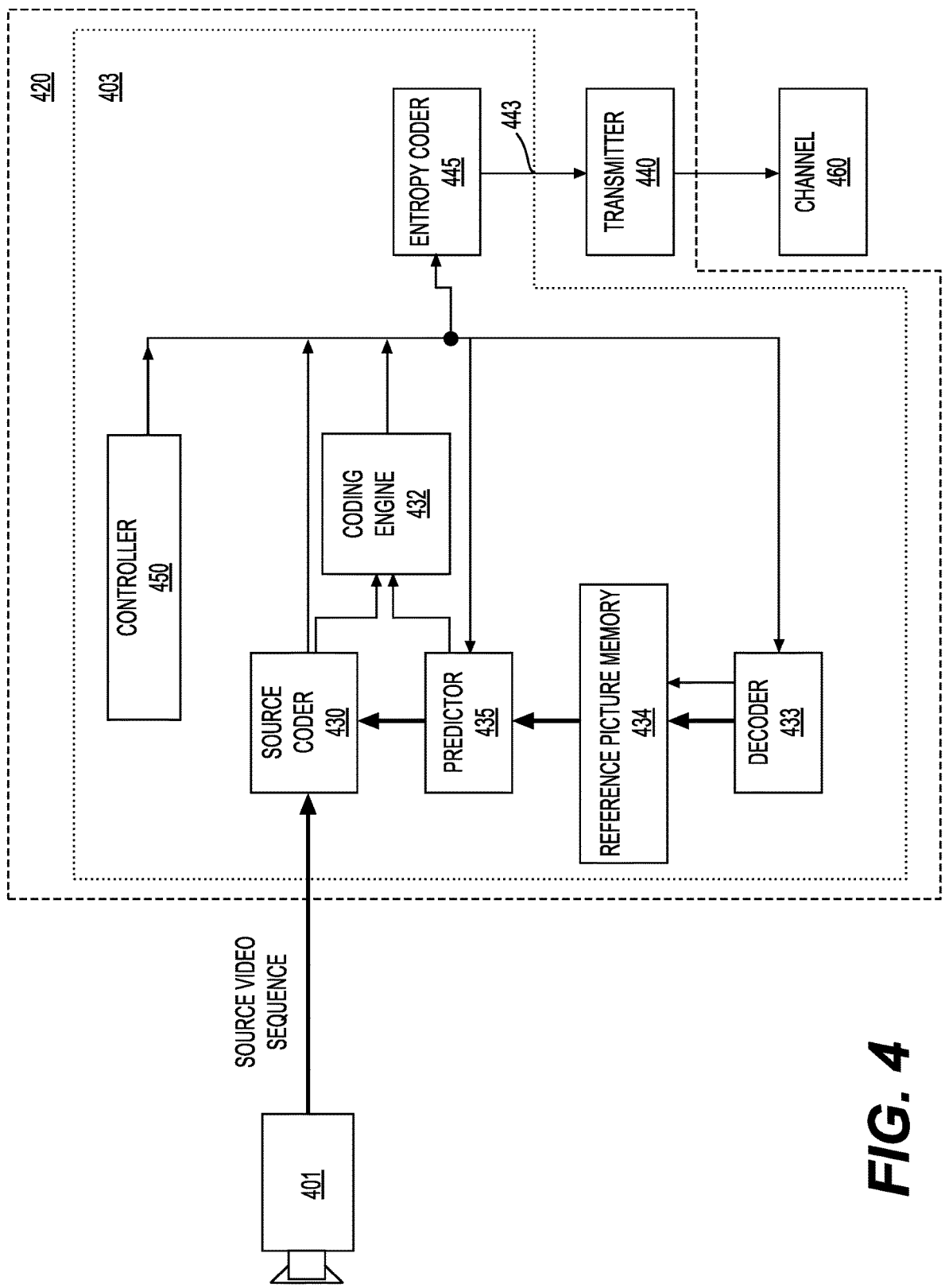
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the High Efficiency Video Coding (HEVC) standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
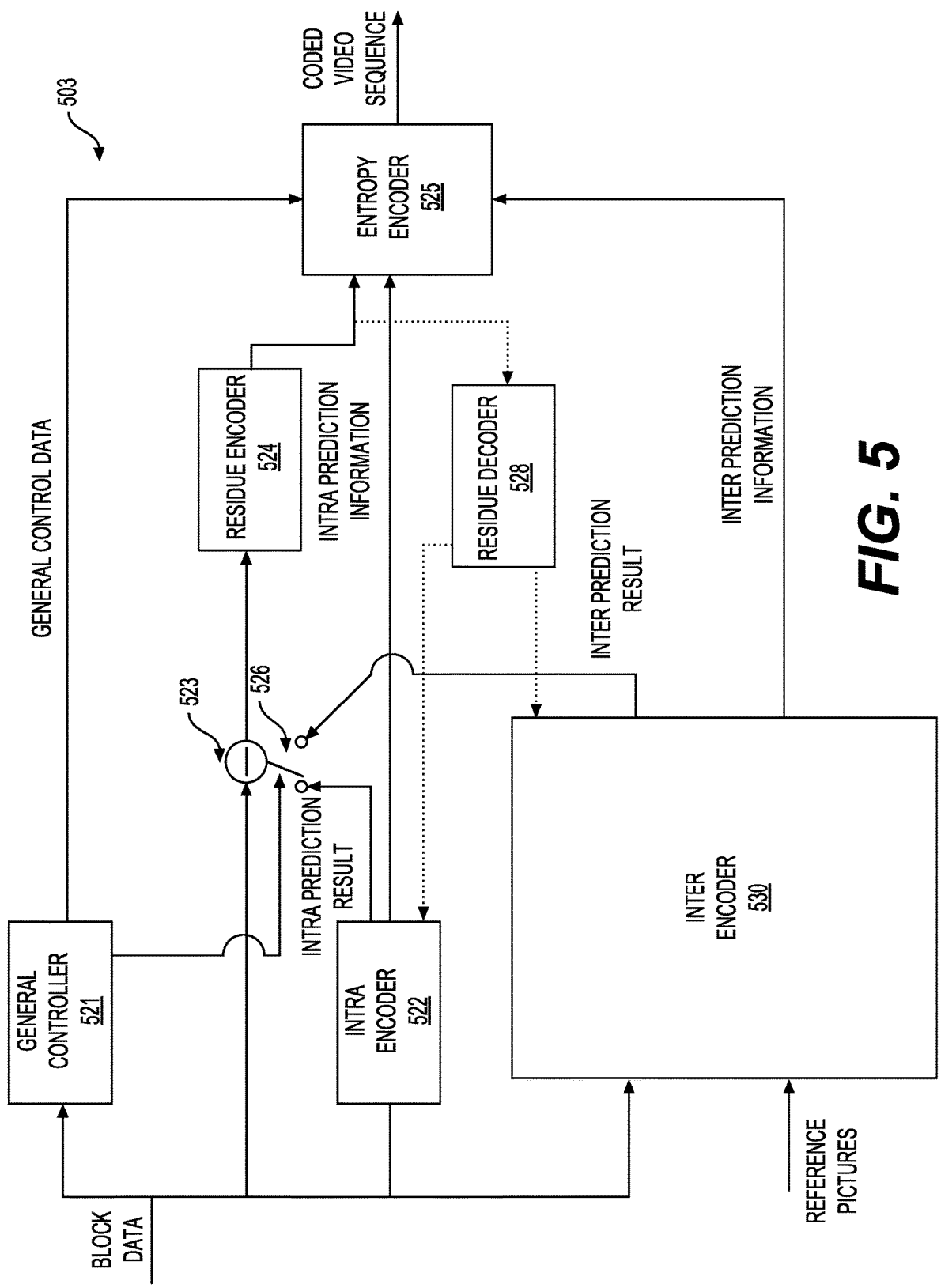
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
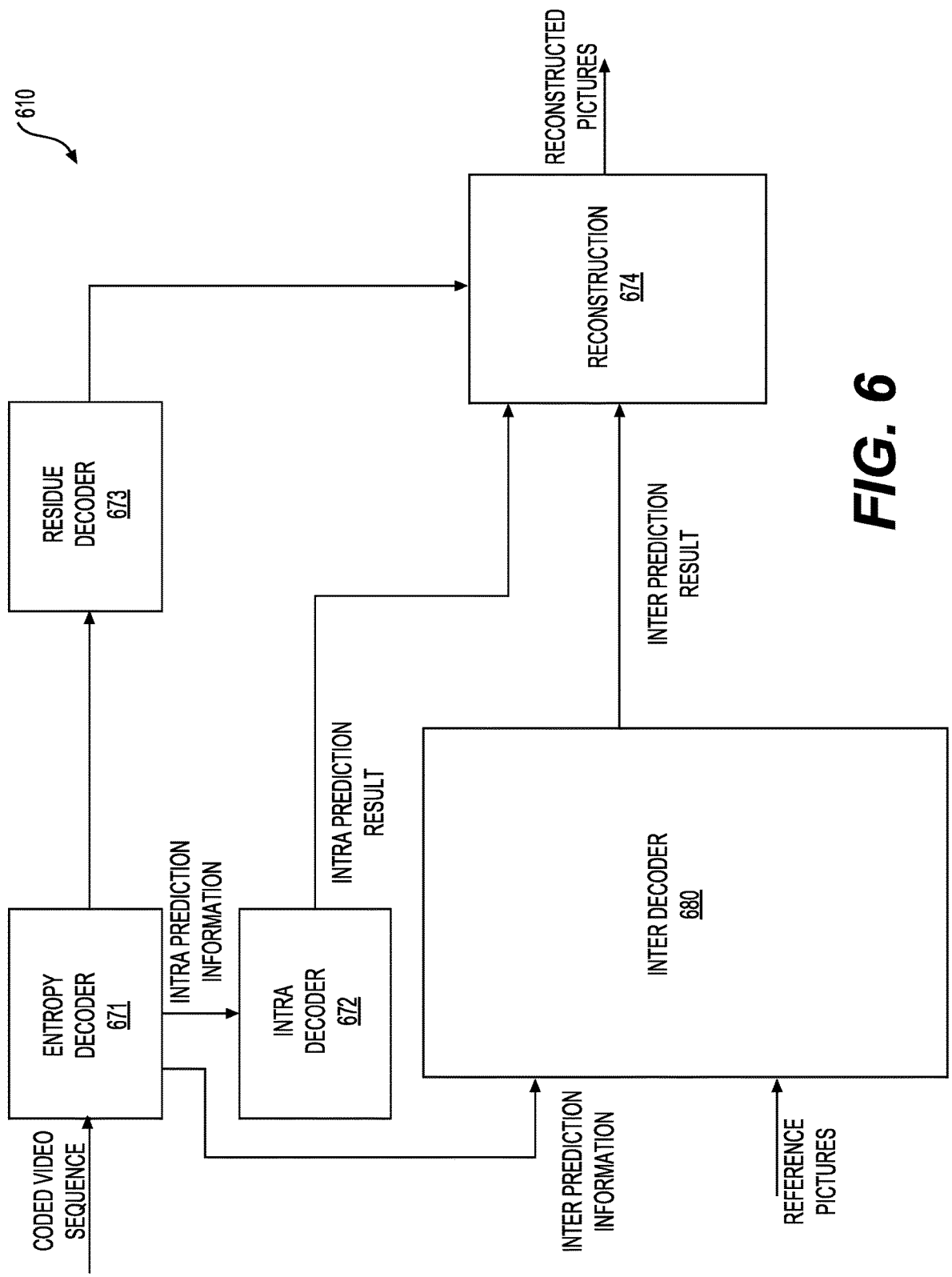
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

The present disclosure includes a video coding approach which may be applied to various video coding techniques and/or standards, including but not limited to HEVC, VVC, and AV1. AV1 stands for AOMedia Video 1 (AV1). AOMedia stands for Alliance for Open Media (AOMedia).

As shown in a first coding tree structure (700) in FIG. 7A, VP9 uses a 4-way partition tree starting from the 64×64 level down to 4×4 level, with some additional restrictions for blocks 8×8. In FIG. 7A, partitions designated as R can be referred to as recursive in that the same partition tree is repeated at a lower scale until we reach the lowest 4×4 level.

As shown in a second coding tree structure (702) in FIG. 7B, AV1 not only expands the partition-tree to a 10-way structure, but also increases the largest size (referred to as a superblock in VP9/AV1 parlance) to start from 128×128. Note that this includes 4:1/1:4 rectangular partitions that did not exist in VP9. The partition types with 3 sub-partitions in the second row of FIG. 7B is called a "T-type" partition. None of the rectangular partitions can be further subdivided. In addition to a coding block size, coding tree depth is defined to indicate the splitting depth from the root note. To be specific, the coding tree depth for the root node, e.g., 128×128, is set to 0, and after a tree block is further split once, the coding tree depth is increased by 1.

Instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 are supported. For chroma blocks, only the largest possible transform units are allowed.

A CTU may be split into CUs by using a quad-tree structure denoted as a coding tree to adapt to various local characteristics, such as in HEVC. The decision on whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another quad-tree structure like the coding tree for the CU. One of the key features of the HEVC structure is that it has multiple partition concepts including CU, PU, and TU. In HEVC, a CU or a TU can only be a square shape, while a PU may be a square or rectangular shape for an inter predicted block. In HEVC, one coding block may be further split into four square sub-blocks, and a transform is performed on each sub-block, i.e., TU. Each TU can be further split recursively (using quad-tree split) into smaller TUs, which is called Residual Quad-Tree (RQT).

At a picture boundary, such as in HEVC, implicit quad-tree split may be employed so that a block will keep quad-tree splitting until the size fits the picture boundary.

A quad-tree with nested multi-type tree using binary and ternary splits segmentation structure, such as in VVC, may replace the concepts of multiple partition unit types, i.e., it removes the separation of the CU, PU, and TU concepts except as needed for CUs that have a size too large for the maximum transform length, and supports more flexibility for CU partition shapes. In the coding tree structure, a CU can have either a square or rectangular shape. ACTU is first partitioned by a quaternary tree (also referred to as quad-tree) structure. The quaternary tree leaf nodes can be further partitioned by a multi-type tree structure. As shown in a third coding tree structure (704) in FIG. 7C, the multi-type tree structure includes four splitting types. For example, the multi-type tree structure includes vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An exception occurs when a maximum supported transform length is smaller than the width or height of the color component of the CU. An example of block partitions for one CTU is shown in FIG. 7D, which illustrates an exemplary quadtree with nested multi-type tree coding block structure.

A maximum supported luma transform size may be 64×64 and the maximum supported chroma transform size maybe 32×32, such as in VVC. When the width or height of the CB is larger than the maximum transform width or height, the CB is automatically split in the horizontal and/or vertical direction to meet the transform size restriction in that direction.

The coding tree scheme supports the ability for the luma and chroma to have a separate block tree structure, such as in VTM7. In some cases, for P and B slices, the luma and chroma CTBs in one CTU have to share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three colour components unless the video is monochrome.

In order to support the extended coding block partitions, multiple transform sizes (e.g., ranging from 4-point to 64-point for each dimension) and transform shapes (e.g., square; rectangular with width/height ratio's 2:1/1:2, and 4:1/1:4) may be utilized, such as in AV1.

A two-dimensional transform process may involve the use of hybrid transform kernels (e.g., composed of different one-dimensional transforms for each dimension of the coded residual block). Primary one-dimensional transforms may include at least one of a) 4-point, 8-point, 16-point, 32-point, 64-point DCT-2; b) 4-point, 8-point, 16-point asymmetric DST's (DST-4, DST-7) and their flipped versions; or c) 4-point, 8-point, 16-point, 32-point identity transforms. The basis functions for the DCT-2 and asymmetric DSTs, such as used in AV1, are listed in Table 1, where "→" and "↓," denote the horizontal and vertical dimensions, and "✓" and "x" denote the availability of a kernel for that block size and prediction mode. IDTX (or IDT) stands for identity transform.

TABLE 1

Exemplary AV1 primary transform basis functions
(DCT-2, DST-4 and DST-7 for N-point input)

| Transform Type | Basis function $T_i(j)$, i, j = 0, 1, ..., N − 1 |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ <br> where $\omega_0 = \begin{cases} \sqrt{\frac{2}{N}} & i = 0 \\ 1 & i \neq 0 \end{cases}$ |
| DST-4 | $T_i(j) = \sqrt{\frac{2}{N}} \cdot \sin\left(\frac{\pi \cdot (2i+1) \cdot (2j+1)}{4N}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |
| IDTX | $T_i(j) = (i == j)? 1:0$ |

The availability of hybrid transform kernels may be based on the transform block size and prediction mode. Exemplary dependencies are listed in Table 2.

TABLE 2

Availability of AV1 hybrid transform kernels
based on prediction modes and block sizes

| | | Prediction mode | |
|---|---|---|---|
| Transform Types | Description | Intra | Inter |
| DCT_DCT | DCT ↓ and → | ✓ (all block sizes) | ✓ (all block sizes) |
| ADST_DCT <br> DCT_ADST <br> ADST_ADST | ADST ↓; DCT → <br> DCT ↓; ADST → <br> ADST ↓ and → | ✓ (block size ≤ 16 × 16) | ✓ (block size ≤ 16 × 16) |

TABLE 2-continued

Availability of AV1 hybrid transform kernels based on prediction modes and block sizes

| Transform Types | Description | Prediction mode Intra | Prediction mode Inter |
|---|---|---|---|
| FLIPADST_DCT | FLIPADST ↓; DCT → | x | ✓ (block size ≤ 16 × 16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16 × 16) | ✓ (block size ≤ 32 × 32) |
| V_DCT | DCT ↓; IDTX → | ✓ (block size < 16 × 16) | ✓ (block size ≤ 16 × 16) |
| H_DCT | IDTX ↓; DCT → | | |
| V_ADST | ADST ↓; IDTX → | x | ✓ (block size < 16 × 16) |
| H_ADST | IDTX ↓; ADST → | | |
| V_FLIPADST | FLIPADST ↓; IDTX → | x | ✓ (block size < 16 × 16) |
| H_FLIPADST | IDTX ↓; FLIPADST → | | |

For a chroma component, the transform type selection is performed in an implicit way. For intra prediction residuals, the transform type is selected according to the intra prediction mode, as specified in Table 3 for example. For inter prediction residuals, the transform type may be selected according to the transform type selection of the co-located luma block. Therefore, for chroma component, no transform type signaling in the bitstream is needed.

TABLE 3

Transform type selection for chroma component intra prediction residuals

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

Line graph transforms (LGTs), such as in AV2, have been introduced with the view of replacing and extending (by introducing 32-point, 64-point) the one-dimensional DSTs described above.

Figure 8:
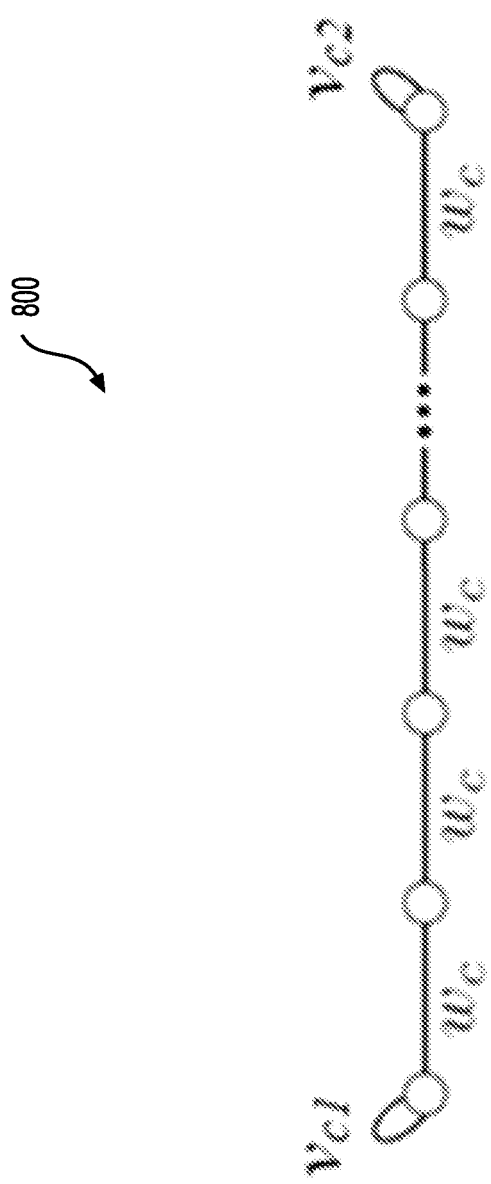
FIG. 8 shows an example of a line graph transform (LGF), in accordance with an embodiment.

Graphs are generic mathematical structures including, or consisting of, sets of vertices and edges, which are used for modelling affinity relations between the objects of interest. In practice, weighted graphs (for which a set of weights are assigned to edges and potentially to vertices) provide sparse representations for robust modeling of signals/data. LGTs can improve coding efficiency by providing a better adaptation for diverse block statistics. Separable LGTs are designed and optimized by learning line graphs from data to model underlying row and column-wise statistics of blocks in residual signals, where the associated generalized graph Laplacian (GGL) matrices are used to derive LGTs. FIG. 8 shows an example LGT (800) characterized by self-loop weights $v_{c1}$, $v_{c2}$, and edge weights $w_c$.

Given a weighted graph G (W, V) the GGL matrix may be defined as:

$$L_c = D - W + V$$

where W is the adjacency matrix including, or consisting of, non-negative edge weights $w_c$, D is the diagonal degree matrix, and V is the diagonal matrix denoting weighted self-loops $v_{c1}$, $v_{c2}$. The matrix $L_c$ can be represented as:

$$L_c = \begin{bmatrix} w_c + v_{c1} & -w_c & & & 0 \\ -w_c & 2w_c & -w_c & & \\ & \ddots & \ddots & \ddots & \\ & & -w_c & 2w_c & -w_c \\ 0 & & & -w_c & w_c + v_{c2} \end{bmatrix}$$

for $w_c > 0$.

The LGTs can then be derived by the eigen-decomposition of the GGL $L_c$:

$$L_c = U \Phi U^T$$

where columns of orthogonal matrix U are the basis vectors of the LGT, and $\Phi$ is the diagonal eigenvalue matrix. In fact, DCTs and DSTs, including DCT-2, DCT-8 and DST-7, are LGTs derived from certain forms of GGLs as follows:

DCT-2 may be derived by setting $v_{c1}=0$
DST-7 may be derived by setting $v_{c1}=w_c$
DCT-8 may be derived by setting $v_{c2}=w_c$
DST-4 may be derived by setting $v_{c1}=2w_c$
DCT-4 may be derived by setting $v_{c2}=2w_c$ The LGTs, such as in AV2, can be implemented as matrix multiplications. The 4p LGT core may be derived by setting $v_{c1}=2w_c$ in $L_c$, which means that it is a DST-4. The 8p LGT core may be derived by setting $v_{c1}=1.5w_c$ in $L_c$. The 16p, 32p, and 64p LGT core may be derived by setting $v_{c1}=w_c$ in $L_c$, which means that it is a DST-7.

In an example of residual coding in AV1, for each transform unit, AV1 coefficient coding starts with signaling a skip sign, and followed by the transform kernel type and the end-of-block (eob) position when the skip sign is zero. Then, each coefficient value is mapped to multiple level maps and the sign.

After the eob position is coded, the lower-level map and the middle-level map are coded in reverse scan order, the former indicating if the coefficient magnitude is between 0 and 2 while the latter indicating if the range is between 3 and 14. The next step codes, in the forward-scanning order, the sign of the coefficient as well as the residual value of the coefficient larger than 14 by Exp-Golomb code.

As for the use of context modeling, the lower-level map coding incorporates the transform size and directions as well as up to five neighboring coefficient information. On the other hand, the middle-level map coding follows a similar approach as with the lower-level map coding except that the number of neighboring coefficients is down to two. The Exp-Golomb code for the residual level as well as the sign of AC coefficient are coded without any context model, while the sign of DC coefficient is coded using its neighbor transform-unit's DC sign.

In an example of residual coding for transform skip, such as in VVC, a CU coded in transform skip mode (TSM) may use a modified transform coding process. The modifications can be summarized as follows: (a) all the subblocks and positions within a subblock are scanned in the forward scanning order; (b) the last significant coefficient position is not signaled; (c) syntax element coded_sub_block_flag is not coded for the last subblock; (d) changes are made to context modelling for syntaxes sig_coeff_flag, abs_level_gt1 and par_level_flag; and (e) sign flag is context coded based on left and above neighboring values.

During development of AV2, a new mode named Forward Skip Coding (FSC) was introduced to modify the transform coding process for IDTX (two-dimensional transform skip). The modifications introduced by FSC, which are similar in functionality to the above-mentioned changes introduced to VVC transform skip mode, can be summarized as follows: (a) all the coded blocks and positions within the coded block are scanned in the forward scanning order; (b) EOB syntax is skipped; (c) reduced contexts are used for coefficient levels; and (d) sign flag is context coded based on left, bottom, and bottom left.

For intra blocks, when FSC mode is chosen, the transform type is not signaled for the transform blocks. Rather, the transform type signaling is bundled with the FSC mode at a coded block level. Inter blocks do not signal FSC mode, but if the transform type is IDTX and screen content flag is enabled, the FSC method is implicitly chosen.

For entropy coding of transform coefficients, coefficient signs are typically coded separately from the magnitude/level (absolute value of coefficient value) using bypass mode. The separate coding means that each coefficient sign may cost one bit to code, which is costly. To improve the entropy coding efficiency of coefficient signs, sign prediction methods are proposed, such as in JVET-D0031 (JVET stands for Joint Video Exploration Team-Joint Video Expert Team). In an example, instead of signaling the sign values, a flag indicating whether the predicted sign is the same as an actual sign is entropy coded using context. The context value depends on the level (absolute value of coefficient value) of the coefficient since a larger level value leads to more accurate predicted sign values.

First, a group of transform coefficients are identified such that the associated signs need to be predicted. Then a set of hypotheses for the predicted sign values of these coefficients are created. For example, for three coefficients, the number of hypotheses can be up to 8 (2^3). To predict the sign values, there is a cost value associated with each hypothesis, and the hypothesis with minimum cost is used to specify the predicted sign values for the coefficients covered by the hypothesis.

Figure 9:
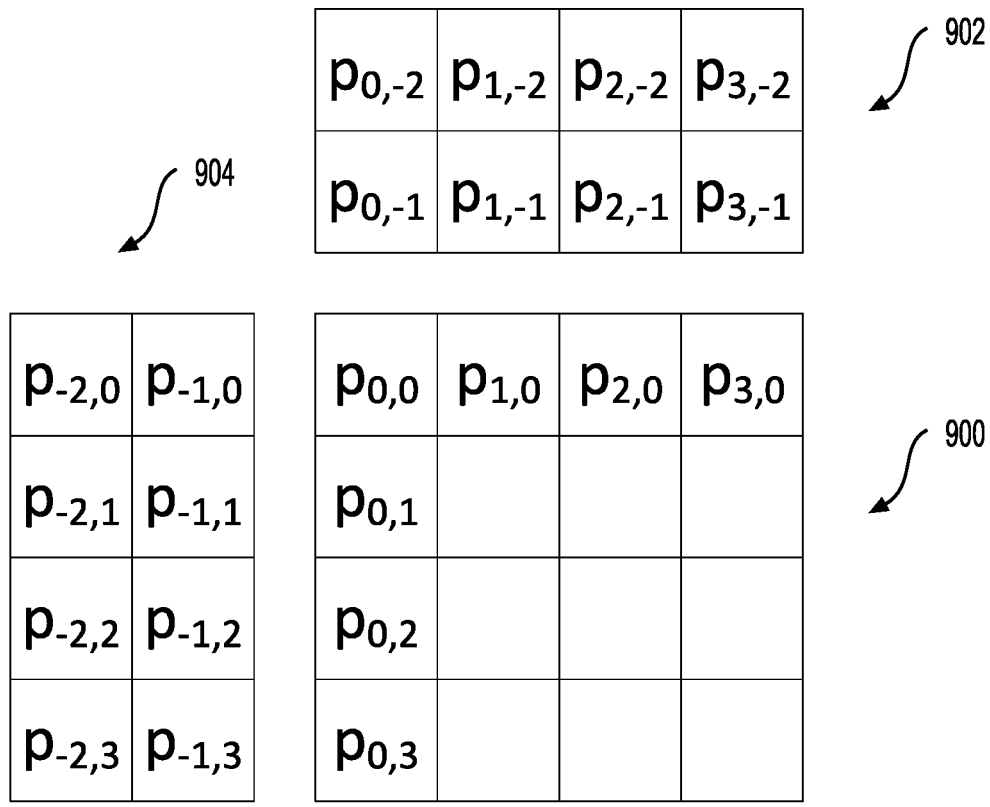
FIG. 9 shows an example of pixel positions in a transform block and adjacent top two rows and left two columns, in accordance with an embodiment.

FIG. 9 shows an example of pixel positions in a transform block (900) and its adjacent top two rows (902) and left two columns (904). The cost for each hypothesis is calculated as follows. A reconstruction block associated with the given hypothesis (hypothesis reconstruction) is generated following the normal reconstruction process (dequantization, inverse transform), and the boundary samples of the reconstructed block, i.e., $p_{0,y}$ and $p_{x,0}$, are derived. For each reconstructed pixel $p_{0,y}$ at the left boundary of the reconstructed block, a simple linear prediction using the two previously-reconstructed neighbor pixels to the left is performed to get its prediction $pred_{0,y}=(2p_{-1,y}-p_{-2,y})$. The absolute difference between this prediction and the reconstructed pixel $p_{0,y}$ is added to the cost of the hypothesis. Similar processing occurs for pixels in the top row of the reconstructed block, summing the absolute differences of each prediction $pred_{x,0}=(2p_{x,-1}-p_{x,-2})$ and the reconstructed pixel $p_{x,0}$. Accordingly, the calculation of the cost for each coefficient sign prediction hypothesis is:

$$\text{cost} = \sum_{x=0}^{w-1} |(2p_{x,\_1} - p_{x,\_2}) - p_{x,0}| + \sum_{y=0}^{h-1} |(2p_{\_1,y} - p_{\_2,y}) - p_{0,y}|$$

In some embodiments, when transform skip (identity transform) is applied in one or both dimensions of a block, or if FSC mode is used for a coded block, the reconstructed neighboring pixels and the pixels in the current block may not be correlated. Thus, the method for coefficient sign prediction may need to be modified to improve coding efficiency.

Embodiments of the present disclosure include transform coefficient sign prediction, such as when transform skip is applied in one or both dimensions. The present methods may be used separately or combined in any order. Further, each of the methods (or embodiments), encoder, and decoder may be implemented by processing circuitry (e.g., one or more processors or one or more integrated circuits (ICs)). In one example, the one or more processors execute a program that is stored in a non-transitory computer-readable medium.

In the present disclosure, the term block may refer to coefficients in a transform block. The term row may refer to a row of coefficients in a transform block. The term column may refer to a column of coefficients in a transform block. Aspects of the disclosure may also be applied to other embodiments, for example, by replacing IDTX with transform skip, or vice versa.

A set of transform types with transform skip in the horizontal direction may be referred to as set A. In an example, set A exhaustively includes combinations, and in some cases all combinations, of one-dimensional transforms, with transform kernel being a matrix. Examples of one-dimensional transforms include, but are not limited to, DCT, ADST, FLIPADST, LGT, FLIPLGT, KLT, all trigonometric transform types (DCT Type 1~8, DST Type 1~8) and their derivatives in the vertical direction and transform skip in the horizontal direction.

A set of transform types with transform skip in the vertical direction may be referred to as set B. In an example, set B exhaustively includes combinations, and in some cases all combinations, of one-dimensional transforms, with transform kernel being a matrix. Examples of one-dimensional transforms include, but are not limited to DCT, ADST, FLIPADST, LGT, FLIPLGT, KLT, all trigonometric transform types (DCT Type 1~8, DST Type 1~8) and their derivatives in the horizontal direction and transform skip in the vertical direction.

The present methods may be applied on luma and/or chroma blocks. Sign coefficients may be predicted differently based on whether an identity transform/transform skip is used in a transform block. In some examples, when one-dimensional identity transform/transform skip is used in a transform block, signs of N coefficients in different columns (e.g., in case of horizontal transform skip) or different rows (e.g., in case of vertical transform skip) are predicted differently as compared to the sign prediction process when identity transform/transform skip is not applied.

In some example embodiments, when one-dimensional identity transform/transform skip is used in a transform block, signs of N coefficients in different columns (e.g., in case of horizontal transform skip) or different rows (e.g., in case of vertical transform skip) are predicted independently using neighboring reconstructed samples.

In one embodiment, sign prediction is disabled when one-dimensional identity transform is applied.

In one embodiment, when transform skip is applied only in a horizontal direction, signs of N coefficients in the first column are predicted using the reconstructed pixels in one or more columns to the left of the first column and reconstructed pixels in one or more rows above the first column. For example, in the A columns to the left of the first column in the transform block and K pixels in the top B rows. Exemplary values of A include, but are not limited to, a value that is greater than or equal 2. Exemplary values of K include, but are not limited to, a value that is greater than or equal to 1. Exemplary values of B include, but are not limited to, a value that is greater than or equal to 2.

For example, referring to FIG. 9, to predict a sign of coefficient $p_{0,1}$ in the first column of the transform block (900) when transform skip is applied only in the horizontal direction, the reconstructed pixels in the 2 columns to the left of the first column in the transform block (pixels $p_{-1,0}$ to $p_{-1,3}$ and $p_{-2,0}$ to $p_{-2,3}$) and two pixels $p_{0,-1}$ and $p_{0,-2}$ in the top two rows directly above $p_{0,1}$ are used.

In one embodiment, when transform skip is applied only in a vertical direction, signs of N coefficients in the first row are predicted using the reconstructed pixels in one or more rows above the top row in the transform block and reconstructed pixels in one or more columns to the left of the first row. For example, in the A rows above the top row in the transform block and K pixels in the left B columns. Exemplary values of A include, but are not limited to, a value that is greater than or equal 2. Exemplary values of K include, but are not limited to, a value that is greater than or equal to 1. Exemplary values of B include, but are not limited to, a value that is greater than or equal to 2.

For example, referring to FIG. 9, for predicting the sign of coefficient $p_{1,0}$ in the first row of the transform block (900), the reconstructed pixels in the 2 rows to the top of the first row (pixels $p_{0,-1}$ to $p_{3,-1}$ and $p_{0,-2}$ to $p_{3,-2}$) and two adjacent pixels $p_{-2,0}$ and $p_{-1,0}$ in the left two columns are used.

In one embodiment, when transform skip is applied in the horizontal direction, signs of N coefficients in each of the columns except the first column are predicted using the reconstructed pixels in the M rows above the top row in the transform block. Exemplary values of M include, but are not limited to a value that is greater than or equal to 2.

In one embodiment, when transform skip is applied in the vertical direction, signs of N coefficients in each of the rows except the first row are predicted using the reconstructed pixels in the M columns to the left of the first column in the transform block. Exemplary values of M include, but are not limited to a value that is greater than or equal to 2.

In one embodiment, the number of coefficient signs predicted when one-dimensional transform skip is applied is different from the number of coefficient signs predicted when transform skip is not applied in any direction. In an example, the number of coefficient signs that are predicted when one-dimensional transform skip is applied is less than the number of coefficient signs predicted when transform skip is not applied in any direction. In another example, the number of coefficient signs that are predicted when one-dimensional transform skip is applied may be greater than the number of coefficient signs predicted when transform skip is not applied in any direction.

In some embodiments, only coefficient signs of N pixels in the first row/column of a transform block are predicted. The coefficient signs may be predicted based on reconstructed pixels of one or more columns to the left and/or one more rows above the transform block. In an example, only the coefficient signs of the N pixels in the first row/column of the transform block are predicted for certain modes, such as when two-dimensional transform skip is used or if FSC mode is used for the coded block. For example, coefficient signs of N pixels only in the first row/column of a transform block are predicted using K adjacent pixels in the top A rows or left B columns adjacent to the transform block. Exemplary values of K include, but are not limited to, a value that is greater than or equal to 1. Exemplary values of A include, but are not limited to, a value that is greater than or equal to 2. Exemplary values of B include, but are not limited to, a value that is greater than or equal to 2.

In one embodiment, when transform skip is applied in both directions, a coefficient sign of the top left pixel can be predicted based on pixels in one or more rows above the top row of a transform block and/or one or more columns to the left of a first column of the transform block. In an example, the coefficient sign of the top left pixel can be predicted using K adjacent pixels in the M rows above the top row and L adjacent pixels in the N columns to the left of the first column. Exemplary values of K include, but are not limited to, a value that is greater than or equal to 1. Exemplary values of M include, but are not limited to, a value that is greater than or equal to 2. Exemplary values of L include, but are not limited to, a value that is greater than or equal to 1. Exemplary values of N include, but are not limited to, a value that is greater than or equal to 2.

For example, referring to the transform block (900) in FIG. 9, a coefficient sign of pixel $p_{0,0}$ is predicted using two pixels each from the top two rows, namely, $p_{0,-1}$, $p_{0,-2}$, and two pixels each from the left two columns, namely, $p_{-1,0}$, $p_{-2,0}$.

In one embodiment, when transform skip is applied in both directions, coefficient signs of N pixels in the first row are predicted based on pixels in one or more rows above the top row of a transform block and/or one or more columns to the left of a first column of the transform block. In an example, the coefficient signs of N pixels in the first row are predicted using K adjacent pixels in the M rows above the top row in the transform block. Exemplary values of K include, but are not limited to, a value that is greater than or equal to 1. Exemplary values of M include, but are not limited to, a value that is greater than or equal to 2.

For example, referring to the transform block (900) in FIG. 9, a coefficient sign of pixel $p_{1,0}$ is predicted using two pixels each from the top two rows, namely, $p_{1,-1}$, $p_{1,-2}$, $p_{0,-1}$, $p_{0,-2}$, and a coefficient sign of pixel $p_{2,0}$ is predicted using two pixels each from the top two rows, namely, $p_{2,-1}$, $p_{2,-2}$, $p_{3,-1}$, $p_{3,-2}$. Alternatively, for example, a coefficient sign of pixel p1,0 may be predicted using p1,-1, p1,-2, p3,-1, p3,-2. Alternatively, for example, a coefficient sign of pixel p2,0 may be predicted using p2,-1, p2,-2, p1,-1, p1,-2.

In one embodiment, when transform skip is applied in both directions, coefficient signs of N pixels in the first column are predicted based on pixels in one or more rows above the top row of a transform block and/or one or more columns to the left of a first column of the transform block. In an example, the coefficient signs of N pixels in the first column are predicted using K adjacent pixels in the M columns to the left of the first column in the transform block. Exemplary values of K include, but are not limited to, a value that is greater than or equal to 1. Exemplary values of M include, but are not limited to, a value that is greater than or equal to 2. For example, a coefficient sign of pixel p0,1 may be predicted using two pixels each from the left two columns, namely, p-1,1, p-2,1, p-1,0, p-2,0, and coefficient sign of pixel p0,2 may be predicted using two pixels each from the left two columns, namely, p−1,2, p−2,2, p−1,3, p−2,3.

In one embodiment, when two-dimensional transform skip is used, coefficient sign prediction is not applied at all.

In one embodiment, for intra coded blocks using FSC mode, coefficient sign prediction is not enabled.

In one embodiment, for inter coded blocks using FSC mode, coefficient sign prediction is not enabled In one embodiment, for inter coded blocks not using FSC mode, coefficient sign prediction is enabled.

Some aspects include an apparatus comprising a memory storing instructions and a processor in communication with the memory, wherein, when the processor executes the instructions, the processor is configured to cause the apparatus to perform a portion or all of the steps described in the disclosure.

Some aspects include a non-transitory computer-readable storage medium, storing computer-readable instructions, wherein, the computer-readable instructions, when executed by one or more processors, are configured to cause the one or more processors to perform a portion or all of the steps described in the disclosure.

Figure 10A:
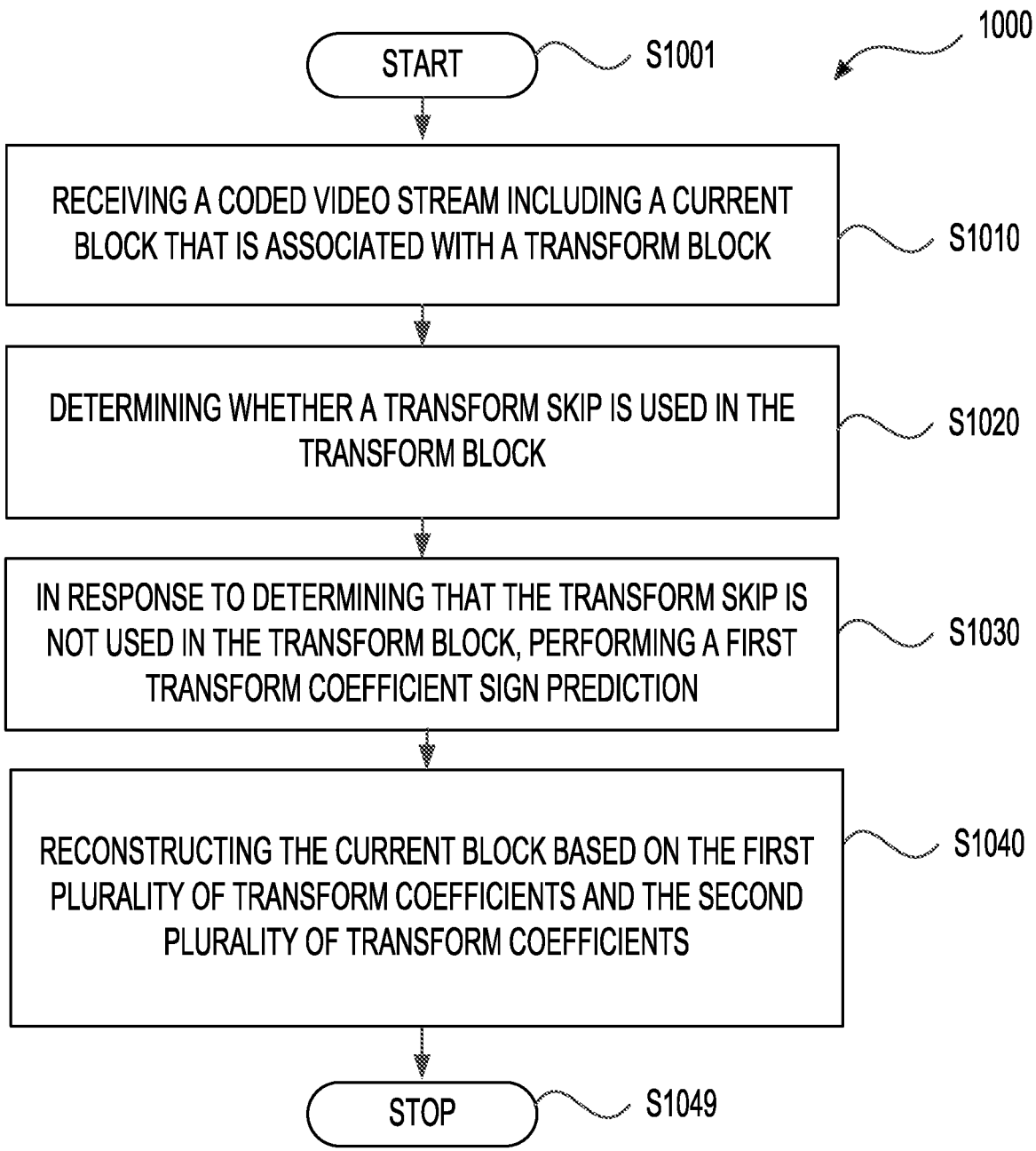
FIG. 10A shows a flow chart outlining a process example according to some embodiments of the disclosure.

FIG. 10A shows a flow chart outlining a process (1000) according to an embodiment of the disclosure. The process (1000) can be used in the reconstruction of a block, so to generate a prediction block for the block under reconstruction. In various embodiments, the process (1000) is executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1000) is implemented in software instructions, thus when the processing circuitry executes the software instructions, the processing circuitry performs the process (1000). The process starts at (S1001) and proceeds to (S1010).

At (S1010), the method (1000) includes receiving a coded video stream including a current block that is associated with a transform block.

At (S1020), the method (1000) includes determining whether a transform skip is used in the transform block.

At (S1030), the method (1000) includes, in response to determining that the transform skip is not used in the transform block, performing a first transform coefficient sign prediction. The first transform coefficient sign prediction includes predicting first signs of a first plurality of transform coefficients based on a first plurality of neighboring samples, and predicting second signs of a second plurality of transform coefficients based on a second plurality of neighboring samples. The prediction of the first signs of the first plurality of transform coefficients is independent from the prediction of the second signs of the second plurality of transform coefficients. At (S1040), the method (1000) includes reconstructing the current block based on the first plurality of transform coefficients and the second plurality of transform coefficients.

Figure 10B:
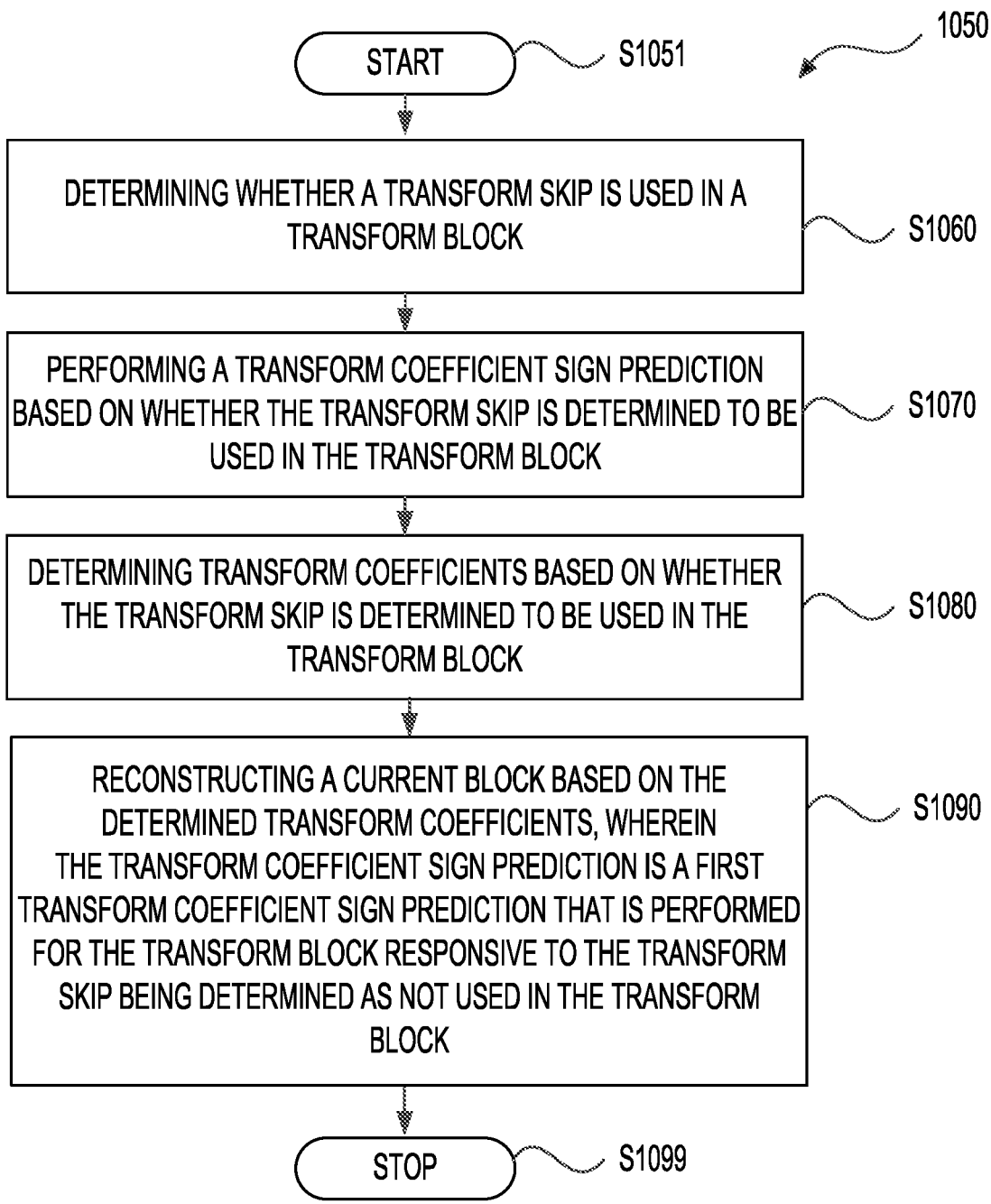
FIG. 10B shows a flow chart outlining a process example according to some embodiments of the disclosure.

FIG. 10B shows a flow chart outlining a process (1050) according to an embodiment of the disclosure. The process (1050) can be used in the reconstruction of a block, so to generate a prediction block for the block under reconstruction. In various embodiments, the process (1050) is executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1050) is implemented in software instructions, thus when the processing circuitry executes the software instructions, the processing circuitry performs the process (1050). The process starts at (S1051) and proceeds to (S1060).

At (S1060), the method (1050) includes determining whether a transform skip is used in a transform block. For example, the method (1050) may determine whether a one-dimensional horizontal transform skip or a one-dimensional vertical transform skip or a two-dimensional transform skip or a FSC has been used in a transform block.

At (S1070), the method (1050) includes performing a transform coefficient sign prediction based on whether the transform skip is determined to be used in the transform block. At (S1080), the method (1050) includes determining transform coefficients based on whether the transform skip is determined to be used in the transform block. At (S1090), the method (1050) includes reconstructing a current block based on the determined transform coefficients, wherein the transform coefficient sign prediction is a first transform coefficient sign prediction that is performed for the transform block responsive to the transform skip being determined as not used in the transform block.

For example, if a one-dimensional horizontal transform skip or a one-dimensional vertical transform skip or a two-dimensional transform skip or a FSC has not been used in the transform block, the method (1050) may perform a first coefficient sign prediction as follows. First, a group of transform coefficients are identified such that the associated signs need to be predicted. Then a set of hypotheses for the predicted sign values of these coefficients are created. For example, for three coefficients, the number of hypotheses can be up to 8 (2^3). To predict the sign values, there is a cost value associated with each hypothesis, and the hypothesis with minimum cost is used to specify the predicted sign values for the coefficients covered by the hypothesis. FIG. 9 shows an example of pixel positions in a transform block (900) and its adjacent top two rows (902) and left two columns (904). The cost for each hypothesis is calculated as follows. A reconstruction block associated with the given hypothesis (hypothesis reconstruction) is generated following the normal reconstruction process (dequantization, inverse transform), and the boundary samples of the reconstructed block, i.e., $p_{0,y}$ and $p_{x,0}$, are derived. For each reconstructed pixel $p_{0,y}$ at the left boundary of the reconstructed block, a simple linear prediction using the two previously-reconstructed neighbor pixels to the left is performed to get its prediction $pred_{0,y}=(2p_{-1,y}-p_{-2,y})$. The absolute difference between this prediction and the reconstructed pixel $p_{0,y}$ is added to the cost of the hypothesis. Similar processing occurs for pixels in the top row of the reconstructed block, summing the absolute differences of each prediction $pred_{x,0}=(2p_{x,-1}-p_{x,-2})$ and the reconstructed pixel $p_{x,0}$. Accordingly, the calculation of the cost for each sign prediction hypothesis is:

$$\text{cost} = \sum_{x=0}^{w-1} |(2p_{x,-1} - p_{x,-2}) - p_{x,0}| + \sum_{y=0}^{h-1} |(2p_{-1,y} - p_{-2,y}) - p_{0,y}|$$

In some optional aspects, the transform coefficient sign prediction is a second transform coefficient sign prediction that is performed for the transform block responsive to the transform skip being determined as used in the transform block, the second transform coefficient sign prediction being different from the first transform coefficient sign prediction. In some other optional aspects, the first transform coefficient sign prediction is disabled responsive to the transform skip being used in the transform block.

For example, if a one-dimensional horizontal transform skip or a one-dimensional vertical transform skip or a two-dimensional transform skip or a FSC has been used in the transform block, the method (1050) may either skip the above-described first coefficient sign prediction for a row or column of the transform block, or perform a second coefficient sign prediction that is different than the above-described first coefficient sign prediction. This is because when transform skip (identity transform) is applied in one or both dimensions of a block, or if FSC mode is used for a coded block, the reconstructed neighboring pixels and the pixels in the current block may not be correlated. Thus, the method for coefficient sign prediction may be modified to improve coding efficiency. For example, when one-dimensional identity transform/transform skip is used in a transform block, signs of N coefficients in different columns (in case of horizontal transform skip) or different rows (in case of vertical transform skip) are predicted differently as compared to the sign prediction process when identity transform/transform skip is not applied. In one embodiment, sign prediction is disabled when one-dimensional identity transform is applied.

In an embodiment, for example, responsive to a one-dimensional horizontal transform skip being used in the transform block, signs of coefficients in different columns of the transform block are predicted by the second transform coefficient sign prediction independently, and the performing the second transform coefficient sign prediction includes predicting a coefficient sign of a column using only reconstructed samples neighboring the column.

In an embodiment, for example, responsive to a one-dimensional horizontal transform skip being used in the transform block, signs of coefficients in a first column of the transform block are predicted by the second transform coefficient sign prediction based on: one or more reconstructed columns to the left of the transform block; and one or more reconstructed pixels above the first column of the transform block. For example, when transform skip is applied only in horizontal direction, signs of N coefficients in the first column are predicted using the reconstructed pixels in the A (example values of A include, but are not limited to, 2, 3, . . . ) columns to the left of the first column in the transform block and K (example values of K include, but are not limited to, 1, 2, 3, . . . ) pixels in the top B (example values of B include, but are not limited to, 2, 3, . . . ) rows. For example, referring to FIG. 9, for predicting the sign of coefficient $p_{0,1}$ in the first column of the transform block (900) when transform skip is applied only in horizontal direction, the reconstructed pixels in the 2 columns to the left of the first column in the transform block (pixels $p_{-1,0}$ to $p_{-1,3}$ and $p_{-2,0}$ to $p_{-2,3}$) and two pixels $p_{0,-1}$ and $p_{0,-2}$ in the top two rows directly above $p_{0,1}$ are used.

In an embodiment, for example, responsive to a one-dimensional horizontal transform skip being used in the transform block, signs of coefficients in a column of the transform block other than a first column are predicted by the second transform coefficient sign prediction using one or more reconstructed pixels in one or more rows above the transform block. For example, when transform skip is applied in the horizontal direction, signs of N coefficients in each of the columns except the first column are predicted using the reconstructed pixels in the M (example values of M include, but are not limited to 2, 3, . . . ) rows above the top row in the transform block.

In an embodiment, for example, responsive to a one-dimensional vertical transform skip being used in the transform block, signs of coefficients in different rows of the transform block are predicted by the second transform coefficient sign prediction independently, and the performing the second transform coefficient sign prediction includes predicting a coefficient sign of a row using only reconstructed samples neighboring the row.

In an embodiment, for example, responsive to a one-dimensional vertical transform skip being used in the transform block, signs of coefficients in a first row of the transform block are predicted by the second transform coefficient sign prediction based on: one or more reconstructed rows above the transform block; and one or more reconstructed pixels to the left of the transform block. For example, when transform skip is applied only in the vertical direction, signs of N coefficients in the first row are predicted using the reconstructed pixels in the A (example values of A include, but are not limited to 2, 3, . . . ) rows above the top row in the transform block and K (example values of K include, but are not limited to 1, 2, 3, . . . ) pixels in the left B (example values of B include, but are not limited to 2, 3, . . . ) columns. For example, referring to FIG. 9, for predicting the sign of coefficient $p_{1,0}$ in the first row of the transform block (900), the reconstructed pixels in the 2 rows to the top of the first row (pixels $p_{0,-1}$ to $p_{3,-1}$ and $p_{0,-2}$ to $p_{3,-2}$) and two adjacent pixels $p_{-2,0}$ and $p_{-1,0}$ in the left two columns are used.

In an embodiment, for example, responsive to a one-dimensional vertical transform skip being used in the transform block, signs of coefficients in a row of the transform block other than a first row are predicted by the second transform coefficient sign prediction using one or more reconstructed pixels in one or more columns to the left of the transform block. For example, when transform skip is applied in the vertical direction, signs of N coefficients in each of the rows except the first row are predicted using the reconstructed pixels in the M (example value of M includes, but not limited to 2, 3, . . . ) columns to the left of the first column in the transform block.

In an embodiment, for example, the transform coefficient sign prediction is disabled responsive to a one-dimensional transform skip being used in the transform block.

In an embodiment, for example, a first total number of signs predicted by the second transform coefficient sign prediction when one-dimensional transform skip is applied in the transform block is different than a second total number of signs predicted by the first transform coefficient sign prediction when the transform skip is not applied in any direction in the transform block.

In an embodiment, for example, responsive to a two-dimensional transform skip or a forward skip coding (FSC) being used in the transform block, the performing the second transform coefficient sign prediction includes predicting a coefficient sign only for pixels in a first row or a first column of the transform block using one or more reconstructed pixels in one or more rows or columns adjacent to the transform block. For example, when two-dimensional transform skip is used or if FSC mode is used for the coded block, signs of N pixels only in the first row/column of a transform block are predicted using K (example values of K includes, but are not limited to, 1, 2, 3, . . . ) adjacent pixels in the top A (example values of A include, but are not limited to, 2, 3, . . . ) rows or left B (example values of B include, but are not limited to 2, 3, . . . ) columns adjacent to the transform block.

In an embodiment, for example, responsive to a two-dimensional transform skip being used in the transform block, a sign of a coefficient in a top left pixel of the transform block is predicted by the second transform coefficient sign prediction based on: one or more reconstructed pixels above the top left pixel in one or more rows above the transform block; and one or more reconstructed pixels to the left of the top left pixel in one or more columns to the left of the transform block. For example, when transform skip is applied in both directions, coefficient sign of the top left pixel can be predicted using K (example values of K include, but are not limited to 1, 2, 3, . . . ) adjacent pixels in the M (example values of M include, but are not limited to 2, 3, . . . ) rows above the top row and L (example values of L include, but are not limited to 1, 2, 3, . . . ) adjacent pixels in the N (example values of N include, but are not limited to 2, 3, . . . ) columns to the left of the first column. For example, referring to the transform block (900) in FIG. 9, coefficient sign of pixel $p_{0,0}$ is predicted using two pixels each from the top two rows, namely, $p_{0,-1}$, $p_{0,-2}$, and two pixels each from the left two columns, namely, $p_{-1,0}$, $p_{-2,0}$.

In an embodiment, for example, responsive to a two-dimensional transform skip being used in the transform block, a sign of a coefficient in a pixel in a first row of the transform block is predicted by the second transform coefficient sign prediction based on: one or more first reconstructed pixels in one or more rows above the transform block and the pixel; and one or more second reconstructed pixels to the left or right of the one or more first reconstructed pixels in the one or more rows. For example, when transform skip is applied in both directions, coefficient signs of N pixels in the first row are predicted using K (example values of K include, but are not limited to, 1, 2, 3, . . . ) adjacent pixels in the M (example values of M include, but are not limited to, 2, 3, . . . ) rows above the top row in the transform block. For example, referring to the transform block (900) in FIG. 9, coefficient sign of pixel $p_{1,0}$ is predicted using two pixels each from the top two rows, namely, $p_{1,-1}$, $p_{1,-2}$, $p_{0,-1}$, $p_{0,-2}$, and coefficient sign of pixel $p_{2,0}$ is predicted using two pixels each from the top two rows, namely, $p_{2,-1}$, $p_{2,-2}$, $p_{3,-1}$, $p_{3,-2}$.

In an embodiment, for example, responsive to a two-dimensional transform skip being used in the transform block, a sign of a coefficient in a pixel in a first column of the transform block is predicted by the second transform coefficient sign prediction based on: one or more first reconstructed pixels in one or more columns to the left of the transform block and the pixel; and one or more second reconstructed pixels above or below the one or more first reconstructed pixels in the one or more columns. For example, when transform skip is applied in both directions, coefficient signs of N pixels in the first column are predicted using K (example values of K include, but are not limited to, 1, 2, 3, . . . ) adjacent pixels in the M (example values of M include, but are not limited to 2, 3, . . . ) columns to the left of the first column in the transform block.

In an embodiment, for example, the transform coefficient sign prediction is not enabled responsive to a two-dimensional transform skip being used in the transform block.

In an embodiment, for example, the transform coefficient sign prediction is not enabled for intra coded blocks using a forward skip coding (FSC) mode.

In an embodiment, for example, the transform coefficient sign prediction is not enabled for inter coded blocks using a forward skip coding (FSC) mode.

In an embodiment, for example, coefficient sign prediction is enabled for inter coded blocks not using a forward skip coding (FSC) mode.

The process stops at (S1099).

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
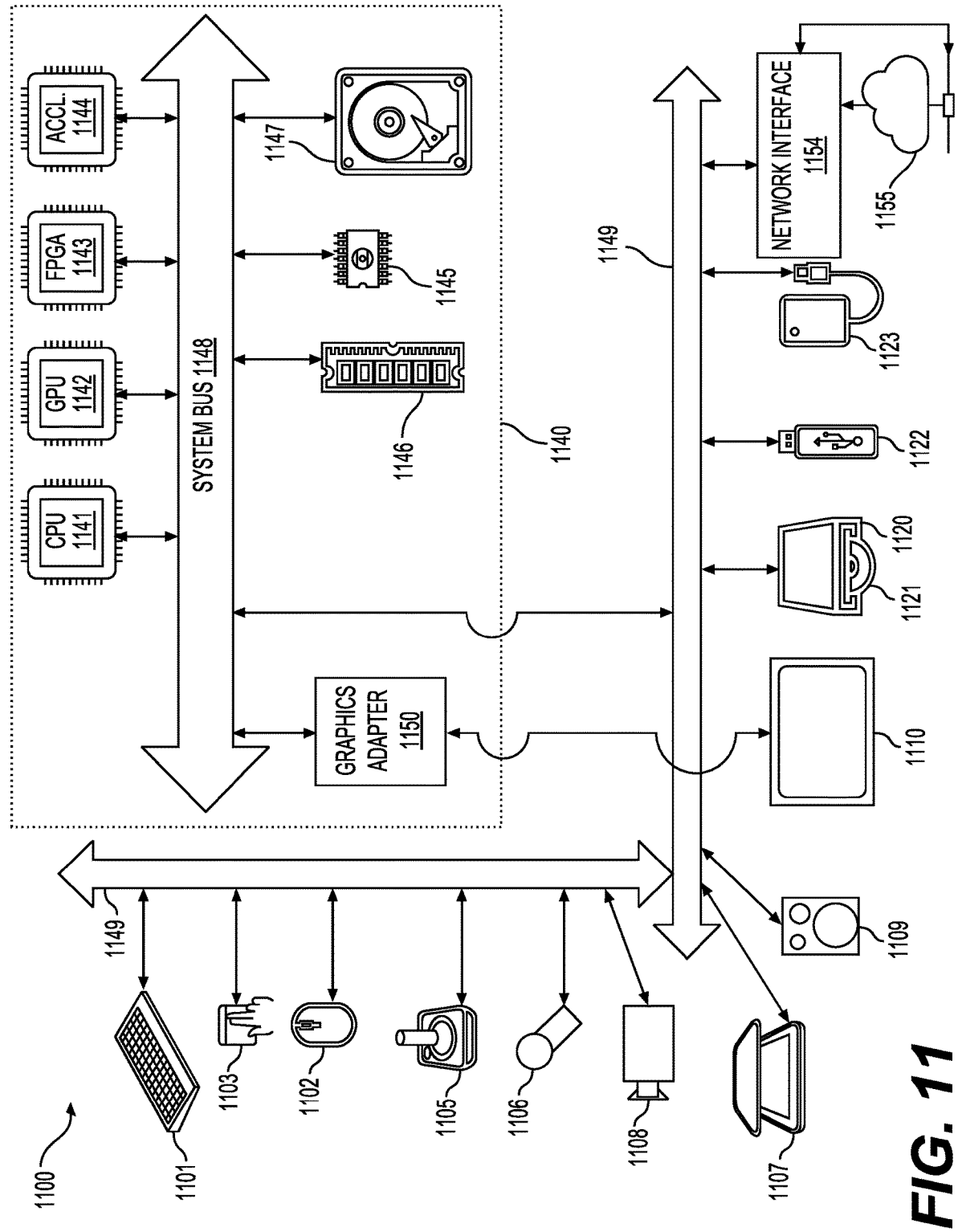
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include Cathode Ray Tube (CRT) screens, Liquid-Crystal Display (LCD) screens, plasma screens, Organic Light-Emitting Diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like. ASIC stands for Application-Specific Integrated Circuit. PLD stands for Programmable Logic Device.

Those skilled in the art should also understand that term "computer readable media" as used in connection with the presently disclosed subject matter does not encompass transmission media, carrier waves, or other transitory signals.

Computer system (1100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless Local Area Networks (LANs), cellular networks to include Global System for Mobile communications (GSM), 3G, 4G, 5G, Long-Term Evolution (LTE), and the like, TV wireline or wireless wide area digital networks to include cable TV, satellite TV, and terrestrial broadcast TV, vehicular and industrial to include Controller Area Network Bus (CAN-Bus), and so forth. Certain networks commonly require external network interface adapters that attached to certain general purpose data ports or peripheral buses (1149) (such as, for example Universal Serial Bus (USB) ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, solid-state drives (SSDs), and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include Peripheral Component Interconnect (PCI), USB, and the like.

CPUs (1141), GPUs (1142), FPGAs (1143), and accelerators (1144) can execute certain instructions that, in combination, can make up the aforementioned computer code. That computer code can be stored in ROM (1145) or Random Access Memory (RAM) (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
   receiving a coded video stream including a current block that is associated with a transform block;

determining whether a transform skip is used in the transform block;
when the transform skip is used in the transform block, obtaining a first set of predicted signs for the transform block by performing a first transform coefficient sign prediction for the transform block, the first transform coefficient sign prediction including:
predicting first signs of a first plurality of transform coefficients based on a first plurality of neighboring samples; and
predicting second signs of a second plurality of transform coefficients based on a second plurality of neighboring samples;
when the transform skip is not used in the transform block, obtaining a second set of predicted signs for the transform block by performing a second transform coefficient sign prediction for the transform block, the second transform coefficient sign prediction being different than the first transform coefficient sign prediction; and
reconstructing the current block based on the transform block and the first or second set of predicted signs.

2. The method of claim 1, wherein:
when the transform skip is a one-dimensional horizontal transform skip, signs of coefficients in different columns of the transform block are predicted independently, including predicting a coefficient sign of a column using only reconstructed samples neighboring the column.

3. The method of claim 1, wherein, when the transform skip is a one-dimensional horizontal transform skip, signs of coefficients in a first column of the transform block are predicted based on:
one or more reconstructed columns to the left of the transform block; and
one or more reconstructed pixels above the first column of the transform block.

4. The method of claim 1, wherein, when the transform skip is a one-dimensional horizontal transform skip, signs of coefficients in a column of the transform block other than a first column are predicted using one or more reconstructed pixels in one or more rows above the transform block.

5. The method of claim 1, wherein, when the transform skip is a one-dimensional vertical transform skip, signs of coefficients in different rows of the transform block are predicted independently, including predicting a coefficient sign of a row using only reconstructed samples neighboring the row.

6. The method of claim 1, wherein, when the transform skip is a one-dimensional vertical transform skip, signs of coefficients in a first row of the transform block are predicted based on:
one or more reconstructed rows above the transform block; and
one or more reconstructed pixels to the left of the transform block.

7. The method of claim 1, wherein, when the transform skip is a one-dimensional vertical transform skip, signs of coefficients in a row of the transform block other than a first row are predicted using one or more reconstructed pixels in one or more columns to the left of the transform block.

8. The method of claim 1, wherein a first total number of signs predicted by the second transform coefficient sign prediction is different than a second total number of signs predicted by the first transform coefficient sign prediction.

9. The method of claim 1, wherein, when the transform skip is a two-dimensional transform skip, performing the first transform coefficient sign prediction includes predicting a coefficient sign only for pixels in a first row or a first column of the transform block using one or more reconstructed pixels in one or more rows or columns adjacent to the transform block.

10. The method of claim 1, wherein, when the transform skip is a forward skip coding (FSC), performing the first transform coefficient sign prediction includes predicting a coefficient sign only for pixels in a first row or a first column of the transform block using one or more reconstructed pixels in one or more rows or columns adjacent to the transform block.

11. The method of claim 1, wherein, when the transform skip is a two-dimensional transform skip, a sign of a coefficient for a top left pixel of the transform block is predicted based on:
one or more reconstructed pixels above the top left pixel in one or more rows above the transform block; and
one or more reconstructed pixels to the left of the top left pixel in one or more columns to the left of the transform block.

12. The method of claim 1, wherein, when the transform skip is a two-dimensional transform skip, a sign of a coefficient in a pixel in a first row of the transform block is predicted based on:
one or more first reconstructed pixels in one or more rows above the transform block and the pixel; and
one or more second reconstructed pixels to the left or right of the one or more first reconstructed pixels in the one or more rows.

13. The method of claim 1, wherein, when the transform skip is a two-dimensional transform skip, a sign of a coefficient in a pixel in a first column of the transform block is predicted based on:
one or more first reconstructed pixels in one or more columns to the left of the transform block and the pixel; and
one or more second reconstructed pixels above or below the one or more first reconstructed pixels in the one or more columns.

14. The method of claim 1, wherein the first transform coefficient sign prediction is enabled for inter coded blocks based on whether a forward skip coding (FSC) mode is used for the inter coded blocks.

15. The method of claim 1, wherein, for the first transform coefficient sign prediction, prediction of the first signs of the first plurality of transform coefficients is independent from prediction of the second signs of the second plurality of transform coefficients.

16. The method of claim 1, wherein the second transform coefficient sign prediction includes predicting respective sets of signs for multiple sets of transform coefficients of the transform block, and wherein each set of signs is predicted independently of other sets of signs.

17. The method of claim 1, wherein the transform skip comprises applying an identity transform.

18. The method of claim 1, wherein sign prediction is disabled for blocks using an FSC mode.

19. A method of video encoding, the method comprising:
receiving video data including a current block that is associated with a transform block;
determining whether a transform skip is to be used in the transform block;
when the transform skip is to be used in the transform block, determining a first set of predicted signs for the transform block by performing a first transform coefficient sign prediction for the transform block, the first transform coefficient sign prediction including:
- predicting first signs of a first plurality of transform coefficients based on a first plurality of neighboring samples; and
- predicting second signs of a second plurality of transform coefficients based on a second plurality of neighboring samples;

when the transform skip is not to be used in the transform block, determining a second set of predicted signs for the transform block by performing a second transform coefficient sign prediction for the transform block, the second transform coefficient sign prediction being different than the first transform coefficient sign prediction; and signaling information for the transform block based on the first or second set of predicted signs.

20. A method of video media bitstream generation, the method comprising:
generating a video bitstream, including:
- receiving video data including a current block that is associated with a transform block;
- determining whether a transform skip is to be used in the transform block;
- when the transform skip is to be used in the transform block, determining a first set of predicted signs for the transform block by performing a first transform coefficient sign prediction for the transform block, the first transform coefficient sign prediction including:
  - predicting first signs of a first plurality of transform coefficients based on a first plurality of neighboring samples; and
  - predicting second signs of a second plurality of transform coefficients based on a second plurality of neighboring samples; and
- when the transform skip is not to be used in the transform block, determining a second set of predicted signs for the transform block by performing a second transform coefficient sign prediction for the transform block, the second transform coefficient sign prediction being different than the first transform coefficient sign prediction; and transmitting the video bitstream including information for the transform block based on the first or second set of predicted signs.

* * * * *